TRANSISTORIZED FM-IR DETECTOR
Filed March 5, 1959
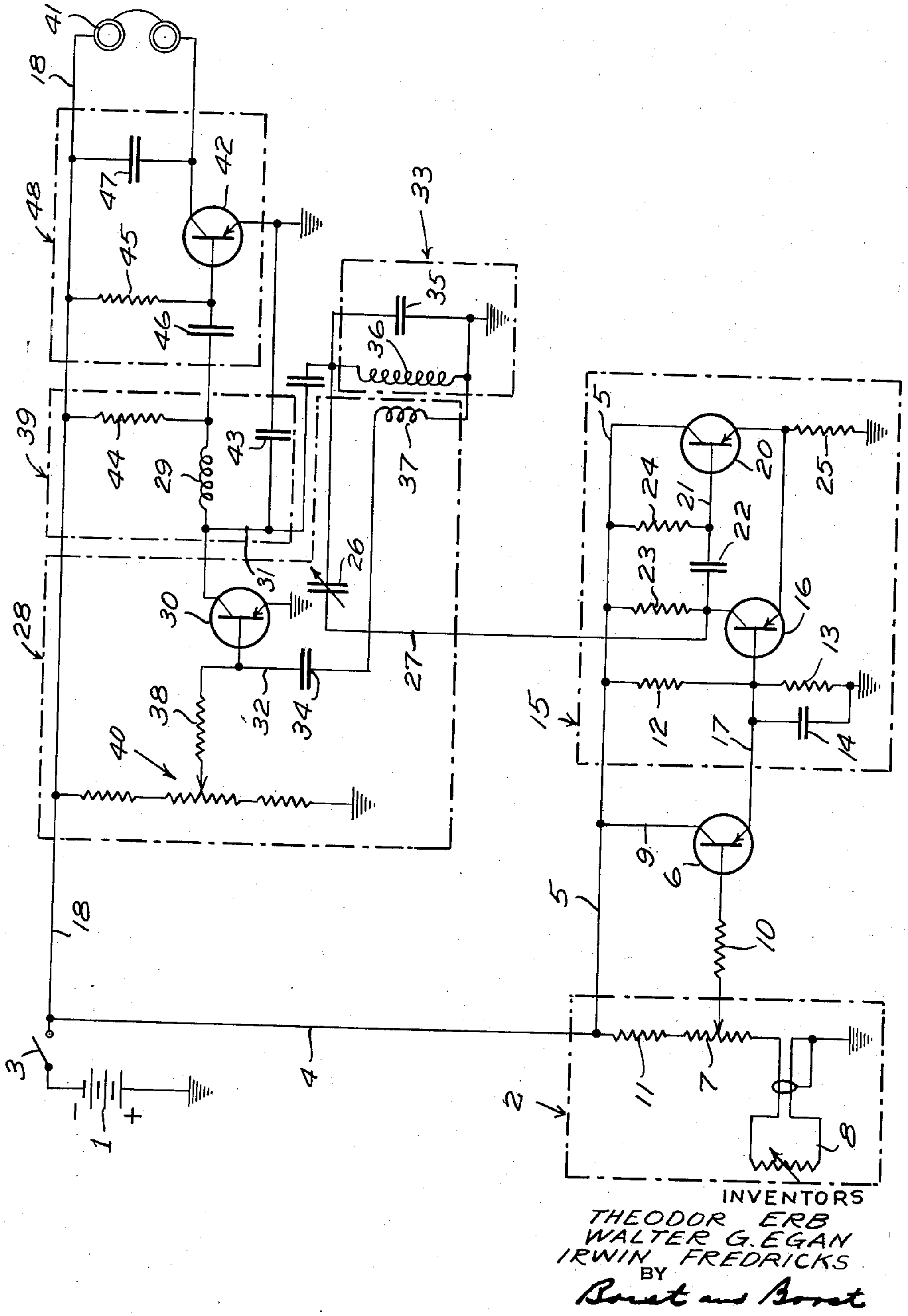
INVENTORS
THEODOR ERB
WALTER G. EGAN
IRWIN FREDRICKS
BY
Borst and Borst
ATTORNEYS United States Patent Office 2,967,940

Patented Jan. 10, 1961

2,967,940

TRANSISTORIZED FM–IR DETECTOR

Theodor Erb, Forest Hills, Walter G. Egan, Richmond Hill, and Irwin Fredricks, Flushing, N.Y., assignors to Sperry Rand Corporation, Ford Instrument Company Division, Wilmington, Del., a corporation of Delaware Filed Mar. 5, 1959, Ser. No. 797,408

4 Claims. (Cl. 250—83.3)

This invention relates to frequency detection systems and particularly to transistorized frequency detection circuits yielding audible signals which are responsive to input voltages.

The detection system contemplated by this invention is adapted for association with visible and infrared sensitive and responsive components and is capable of audibly measuring any variations in the electromagnetic radiation detected by the particular component employed by the system. Most of such components, the "Ektron" detector being one example, have high source impedance and the system provides a transistor network to transform this high source impedance to the relatively low impedance of the units employed to receive the system's input.

In general, the transistorized FM–IR detector, as contemplated by this invention, is incorporated into a circuit which is responsive to an infrared sensitive detector. To this end, an infrared detector is arranged to vary the voltage applied to a free running multivibrator through an impedance transforming transistor network. An oscillating frequency detector, tuned to one of the harmonics of the free running multivibrator is provided to receive the output of the free running multivibrator and beat with the output of the multivibrator so that the resulting transformed frequency of the multivibrator can be heard audibly by a conventional earphone device. The transistorized network between the infrared detector and the multivibrator comprises a unique arrangement of an emitter follower transistor circuit. The frequency detector disposed on the output side of the multivibrator must be adapted to be tuned to a frequency slightly different from the frequency of the usable harmonic in the output of the multivibrator.

One object of the invention is to provide a unique transistorized system adapted to be employed as a frequency detector in an electromagnetic energy sensitive circuit. A more complete understanding of the frequency detector circuit, as contemplated by this invention, can be gained by reading the following description, which is taken in view of the accompanying drawing, which illustrates one embodiment of the detector system.

Referring to the drawing, a battery 1 is connected to a voltage divider 2, by means of switch 3 and lead 4. The voltage divider 2 consists of series connected resistor 11, potentiometer 7, and an infrared detector 8. The detector 8 may be either the well known "Ektron" detector or the conventional thermistor. The variable contact of potentiometer 7 is connected to the base of transistor 6 through an impedance matching resistor 10 which provides base bias. The collector of transistor 6 is connected to battery 1 by means of collector lead 9 and lead 5 which is connected to lead 4. By this arrangement the battery 1 is adapted to provide collector voltage for the transistor 6 and bias for the detector 8.

A free running multivibrator 15 is connected to receive the output of transistor 6. The multivibrator 15 consists of a capacitor coupled pair of transistors 16 and 20, a filtering capacitor 14, a voltage divider 12 and 13, a coupling capacitor 22, a load resistor 23 and a bias resistor 24. The base of the transistor 16 is connected to the emitter lead 17 of transistor 6, so as to permit variation of the base bias of transistor 6, and is slightly filtered by capacitor 14 which is connected between lead 17 and ground. The bias of transistor 16 is also determined by the voltage divider consisting of resistors 12 and 13, resistor 12 being connected between lead 5 and lead 17 and resistor 13 being connected between lead 17 and ground. The base of the transistor 20 is connected to the collector of the transistor 16 by coupling lead 21, which includes the coupling capacitor 22. The collector load resistor 23 is connected between the collector supply lead 5 and the collector electrode of the transistor 16 and the base bias resistor 24 is connected between the collector supply lead 5 and the base electrode of the transistor 20. The common emitter resistor 25 is provided for feedback coupling of the emitter electrodes of the transistors 16 and 20.

A variable condenser 26 in lead 27 introduces the output of the free running multivibrator 15 into a frequency detector circuit 28 which is specially adapted to indicate the frequency variations in the multivibrator by an audio tone. The detector circuit 28 includes a transistor 30 which is part of an oscillatory circuit capable of being tuned to one of the harmonics of the multivibrator. Accordingly, a capacitance lead 31 connected between an isolating inductance coil 29 and the collector electrode of the transistor 30 and an input capacitance feedback lead 32 connected to the base of the transistor 30 are connected across the tuning circuit section 33 of the oscillatory detector circuit 28 comprising a shunting capacitor 35 and a shunting inductance 36. One side of the tuned circuit is connected to the multivibrator output lead 27 and the output feedback capacitance lead 31 while the other side of the tuning circuit 33 is connected to the input feedback capacitance lead 32 which includes a feedback inductance coil 37 and a capacitor 34. The transistor 30 in the detector circuit 28 is base biased by a resistor 38 which is connected through a variable contact to a series resistor bank 40. The series resistor bank 40 is supplied by the battery 1 through the line 18.

The inductance coil 29 transmits the audio output of the frequency tuned, oscillating circuit 28 and provides a beat frequency to earphone components 41 through an audio amplifying circuit 48, which consists of an amplifying transistor 42, resistor 45 and condenser 47 which removes high frequency audio noise variations appearing at the output of the amplifier 48. Specifically, the inductance coil 29 is connected through a coupling capacitor 46 to the base electrode of the amplifying transistor 42 which has a grounded emitter electrode and a collector electrode connected into the earphone components 41, the condenser 47 being connected between the collector lead of transistor 42 and line 18 and the resistor 45 being connected between line 18 and the junction of the capacitor 46 and the base electrode of transistor 42. A frequency filter system 39 is disposed between the circuit 28 and the audio amplifier 48 and comprises capacitor 43, inductance 29 and resistor 44. Earphones 41 are connected across the output of the audio amplifier 48.

In operation, the battery 1 applies a bias voltage across the voltage divider 2. Hence the current through the resistors 7 and 11 and the voltage across them depends upon the intensity of the infrared radiation incident on the infrared sensing detector 8. Any change in the infrared radiation intensity results in a change in the resistance of the detector and alters the current and voltage across the resistors 7 and 11. Part of this voltage change appears at the base of the transistor 6, thus causing a change in the emitter voltage of the transistor 6 which modulates the normal frequency of the free running multivibrator 15. This variation in frequency of the free running multivibrator is detected by the detector circuit 28 which is tuned to the seventh harmonic of the vibrator differing, however, by an audible amount from this harmonic so that a beat note of the audio difference can be heard by the audio amplifier disposed to receive the output of the detector circuit.

It may be appreciated that the system operates on the principle of absolute frequency change indication. Differential level indication is theoretically achievable by very slight modification in the arrangement of the approved circuit embodiment by introducing, for example, a coupling capacitor in series with a suitable base biasing network for transistor 6. The transistorized system has been found to be capable of detecting power changes of less than $6.5\times10^{-11}$ watts which is near the thermal noise level of the detector. In practice, the following typical operating conditions were employed; bias voltage V applied to the resistor 10 was approximately −2.0 volts, multivibrator fundamental frequency in the range of .200 to .400 mc., multivibrator pulse amplitude in the range of 1.0 to 1.5 volts, modulation sensitivity 45% per volt, receiver frequency 1 to 1.5 mc. and output voltage (peak-to-peak across phones) 0.1 volt. The system may permit even higher sensitivity except that transistor noise would be excessive. Other modifications in the circuit may be effected by persons skilled in the art without departing from the invention, the scope of which is defined in the following claims.

What is claimed is:

1. An audio responsive system comprising an infrared detector, a transistor having the conventional base, emitter and collector electrodes, the base electrode of said transistor being arranged to receive the output of said radiation sensitive device, a free running multivibrator modulation controlled by said transistor, a frequency tuned detector circuit disposed to receive the output of said multivibrator and adapted to establish an audio beat frequency and an audio amplifier and indicator circuit coupled to said detector circuit.

2. An audio responsive system as claimed in claim 1 wherein a filtering circuit is disposed between said frequency detector circuit and said audio amplifier and indicator circuit.

3. An audio responsive system as claimed in claim 2 wherein a tuning circuit is connected to said frequency detector circuit.

4. An audio responsive system comprising a voltage source, a free running oscillator connected to said source, an audio frequency tuned detector circuit connected to said source and to the output side of said oscillator, a variable impedance network also connected to said source and including an infrared detector, means controlled by said network for modulating said oscillator and a low frequency indicator connected to the detector circuit and adapted to afford audible indication of such oscillator modulation.

References Cited in the file of this patent

UNITED STATES PATENTS

| | | |
|---|---|---|
| 2,824,973 | Gunlach et al. | Feb. 25, 1958 |
| 2,838,680 | Bender et al. | June 10, 1958 |
| 2,839,678 | Dewitz | June 17, 1958 |

OTHER REFERENCES

Transistorized Scintillation Counter by Louis A. Kueker, from Radio-Electronics, March 1957, pages 34 to 37.